(No Model.)
2 Sheets—Sheet 1.

C. E. CROCKETT.
REFRIGERATING COUNTER FOR BAR ROOMS.

No. 293,425.    Patented Feb. 12, 1884.

WITNESSES:
C. Neveux
C. Sedgwick

INVENTOR:
C. E. Crockett
BY Munn & Co.
ATTORNEYS.

(No Model.) 2 Sheets—Sheet 2.

C. E. CROCKETT.
REFRIGERATING COUNTER FOR BAR ROOMS.

No. 293,425. Patented Feb. 12, 1884.

WITNESSES:
C. Neveux
C. Sedgwick

INVENTOR:
C. E. Crockett
BY Munn & Co.
ATTORNEYS.

N. PETERS, Photo-Lithographer, Washington, D. C.

UNITED STATES PATENT OFFICE.

CHARLES ELEORY CROCKETT, OF WAUPUN, WISCONSIN.

REFRIGERATING-COUNTER FOR BAR-ROOMS.

SPECIFICATION forming part of Letters Patent No. 293,425, dated February 12, 1884.

Application filed November 24, 1883. (No model.)

*To all whom it may concern:*

Be it known that I, CHARLES E. CROCKETT, of Waupun, in the county of Fond du Lac and State of Wisconsin, have invented a new and Improved Refrigerating-Counter for Bar-Rooms, of which the following is a full, clear, and exact description.

The object of my invention is to provide a new and improved refrigerating-counter for bar-rooms in which a large quantity of ice can be stored in a comparatively small space, all the bottles, ingredients, &c., required by a bar-keeper will be very handy, and the liquids to be dispensed by the bar-keeper will always be kept cool.

The invention consists in the combination, with a refrigerating-counter for bar-rooms, of an ice-box formed of two or more sections, having hollow walls forming air-chambers around the sections, each of which sections is provided at its front with a horizontally-projecting work-board. One of the sections is provided with a series of pigeon-holes for receiving bottles, with drawers and boxes for cash, implements, spices, sugar, &c., with a box for containing cracked ice, and with rinsing tanks or cups, which can be fixed or held in swinging arms.

The invention further consists in the combination, with one of the hollow sections, of an air-forcing apparatus for forcing air into the air-chamber formed around the section, and of pipes for connecting the air-chamber with the barrel or keg in the section, and connecting the barrel or keg with a faucet on the bar.

The invention also consists in various parts and details and combinations of the same, as will be fully described and set forth hereinafter.

Reference is to be had to the accompanying drawings, forming part of this specification, in which similar letters of reference indicate corresponding parts in all the figures.

Figure 1:
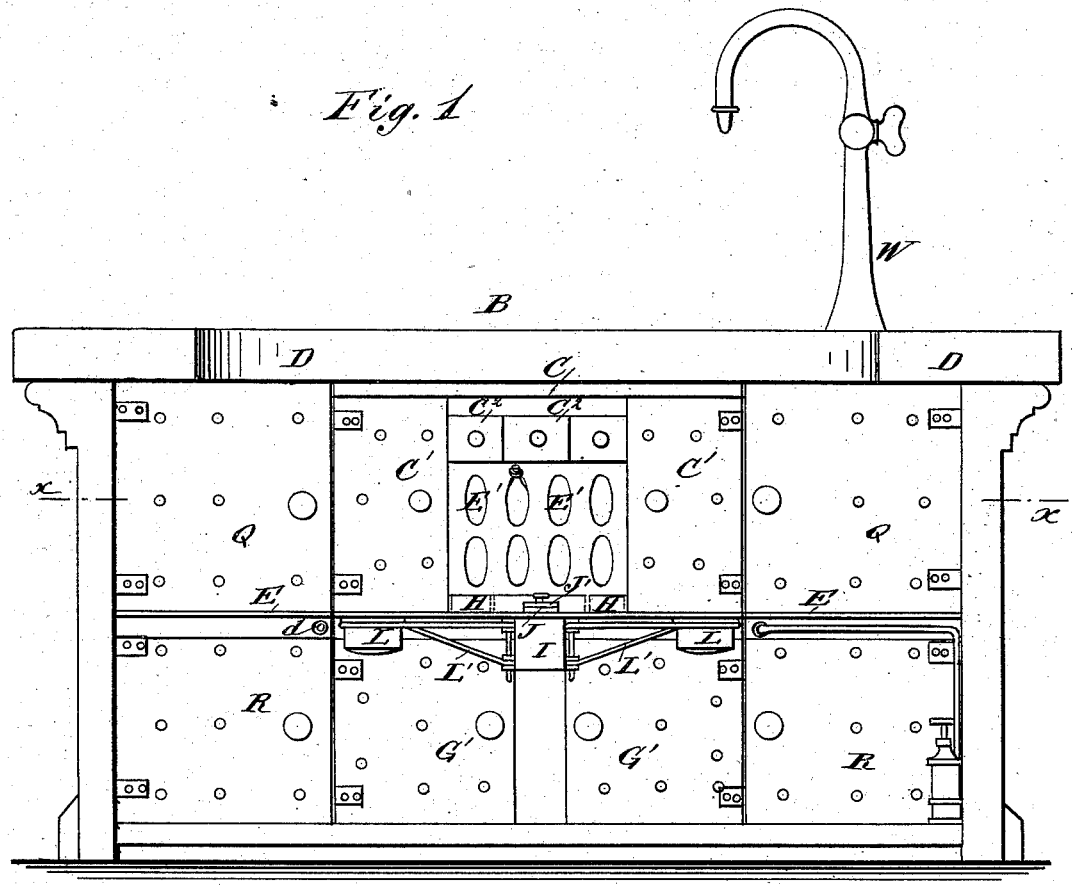
Figure 2:
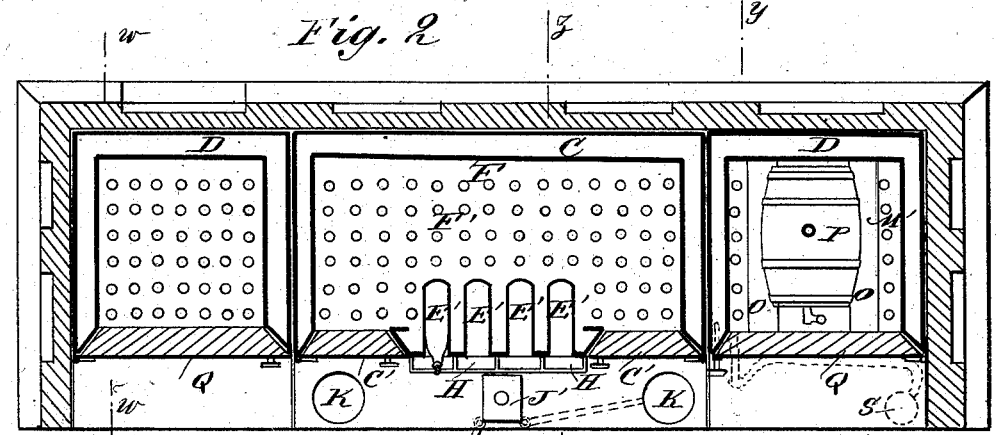
Figure 3:
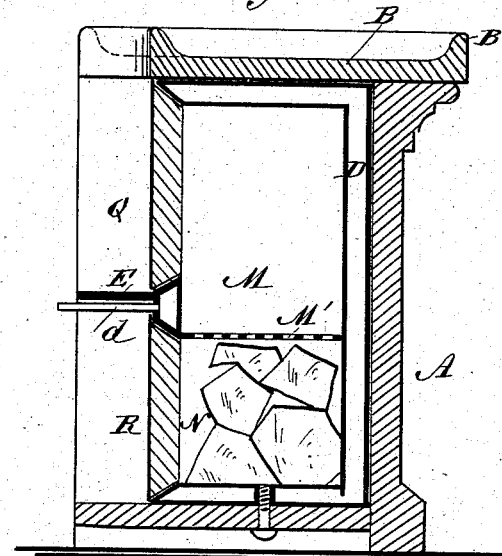
Figure 4:
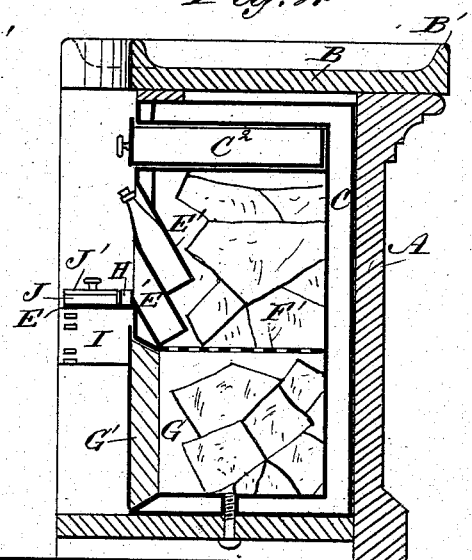
Figure 5:
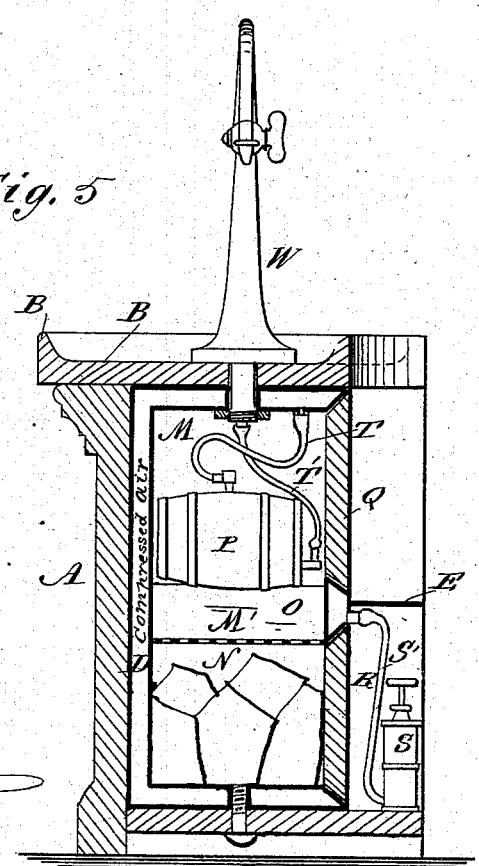
Figure 6:
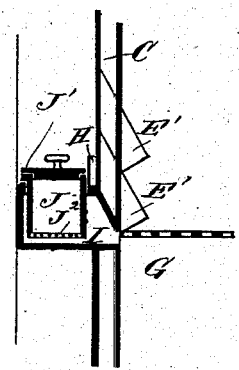

Figure 1 is a rear elevation of my improved refrigerating-counter for bar-rooms. Fig. 2 is a sectional plan view of the same on the line *x x*, Fig. 1. Fig. 3 is a cross-sectional elevation of the same on the line *w w*, Fig. 2. Fig. 4 is a cross-sectional elevation on the line *z z*, Fig. 2. Fig. 5 is a cross-sectional elevation on the line *y y*, Fig. 2. Fig. 6 is a detail cross-sectional elevation of the box for receiving cracked ice.

The bar A, made in the usual manner, is provided with a top plate, B, having an armrest or ledge, B', along the edges to prevent spilled liquids from flowing over the edges of the top plate.

The ice-box, which is contained within the bar, the front of the ice-box being at the rear of the bar, is composed of a middle section, C, and two side sections, D, which are made independent of each other, and can be removed from the bar separately. Each section or box C D is made with hollow walls, and is provided at the front of the ice-box with openings having beveled edges for the doors, which also have beveled edges. At about the middle of the height of the sections a work-board, E, projects from the front of the sections of the ice-box. Above the work-board a series of downwardly-inclined pigeon-holes or pockets, E', for receiving bottles are arranged in the middle of the middle section, C, the said pockets extending into the compartment F of said section, provided with a perforated bottom, F', which compartment is provided with two doors, C'— one at each side of the pigeon-holes. The ice contained in the ice-box rests against the pockets or pigeon-holes, so that the bottles in the said pockets or pigeon-holes will be kept as cool as though the bottles rested directly on the ice. Above the pigeon-holes three drawers, $C^2$, for cash, lemons, oranges, spices, spoons, mixers, and other ingredients and implements are arranged. Below the compartment F another compartment, G, is arranged, which is provided with two doors, G', which are below the work-board E. Below the pockets E' and above the work-board E a series of boxes or receptacles, H, are arranged, which are to receive sugar, spices, flavors, extracts, &c. In front of the said boxes H a box, I, is arranged, which projects downward from the work-board E, and has its inner end in communication with the compartment G, as shown in Fig. 6. In the box I a smaller box, J, is placed, which is provided with a cover, J', and with a perforated bottom, $J^2$. Cracked ice is to be placed in the box J, the drippings from the ice flowing through the perforated bottom $J^2$ into the box I, and from the same into the box C. That portion of the work-board E projecting from the middle ice-box section, C, is provided at each end with an opening, K, below each of which openings a rinsing tank or cup, L, is held, which rinsing-tanks can be fixed or can be secured to arms L', adapted to swing under the working-board E, the said arms being hinged to the outer ends of the box I. The side sections, D D, are constructed alike, and each one is provided with an upper compartment, M, above the work-board E, and a compartment, N, below it, the two compartments being separated by a horizontal partition, M', on which a frame, O, rests for carrying a keg or barrel of beer, P. The compartments M and N are provided with the doors Q and R, respectively. An air-pump, S, arranged on the base of the bar and below the work-board E, is connected by a tube, S', with the hollow chamber formed around a section, D. A flexible tube, T, extends from the top of the hollow wall of the section D to a bung or plug, which is driven in the keg or barrel P, and the faucet of the keg or barrel is connected by a flexible tube, T', with the lower end of the faucet W, arranged on the top of the bar. Each section is provided with a projecting pipe, d, directly below the work-board, for connecting the hollow wall of the section with an air-forcing apparatus. If desired, an ale or beer keg can be placed in each side section, D, or in only one. Bottles containing different kinds of liquors, aerated waters, &c., can also be placed in the compartments M and N or in the compartments F and G; or, if desired, only one compartment—that is, only the upper or the lower one of the section—need be used as an ice-receptacle, the other compartment of the section being used to receive the articles to be cooled.

All the articles, bottles, &c., required by the bar-keeper are very handy, and the bar-keeper need not leave his bar in order to draw liquors, beer, &c., from the barrels, there is a great saving in ice and space, and, as the three sections are independent of each other, one can easily be removed for cleaning or repairing without disturbing the others.

The operation of the beer-pump is as follows: By means of the air-forcing apparatus the air in the chamber formed in the walls of the sections D is compressed more or less, and the compressed air passes through the pipe T from the said chamber into the barrel or keg P, and exerts a pressure on the surface of the contents. If the faucet W is turned, the pressure of the air forces the liquor through the pipe T' into the faucet W, from which it flows into the glass. As that part of the barrel not filled by the liquor is filled with fresh air, the beer cannot become stale, and will always remain fresh, whether it is on tap a day or a week. The beer need not be pumped a great distance, but is forced directly from the barrel into the faucet W. When the keg is emptied, it can readily be replaced by another, and the connections with the pipes T and T' can be made in an instant. The air-forcing apparatus, being arranged at the end of the bar, occupies very little space and is out of the way.

Having thus described my invention, what I claim as new, and desire to secure by Letters Patent, is—

1. A refrigerating-counter for bar-rooms, containing an ice-box made in two or more independent removable sections, substantially as herein shown and described.

2. A refrigerating-counter for bar-rooms, containing an ice-box made in two or more independent removable sections, having hollow walls, substantially as herein shown and described.

3. The combination, with a refrigerating-counter for bar-rooms, of an ice-box provided with a series of pigeon-holes, with drawers above the pigeon-holes, and boxes for sugar, spices, &c., below the pigeon-holes, substantially as herein shown and described.

4. The combination, with a refrigerating-counter for bar-rooms, of an ice-box having a work-board projecting from its front at about the middle of its height, pigeon-holes for bottles, arranged above the work-board, and doors for the ice-box, arranged above and below the work-board, substantially as herein shown and described.

5. The combination, with a refrigerating-counter for bar-rooms, of an ice-box provided with a work-board projecting from its front at about the middle of its height, which work-board is provided with an aperture at one or both ends, and of rinsing tanks or cups held removably below the said apertures, substantially as herein shown and described.

6. The combination, with a refrigerating-counter for bar-rooms, of an ice-box provided with a work-board projecting from its front at about the middle of its height, which work-board is provided with an aperture at one or both ends, of rinsing tanks or cups held below the said apertures, and of swinging arms, in which the rinsing-cups are held, substantially as herein shown and described.

7. The combination, with a refrigerating-counter for bar-rooms, of an ice-box provided with a work-board projecting from the middle of its front, a box, I, arranged in the work-board and projecting from the same, and the box J, contained in the box I, and provided with an apertured bottom, substantially as herein shown and described.

8. The combination, with a refrigerating-counter for bar-rooms, of an ice-box provided with a work-board projecting from the middle of its front, a box, I, arranged in the work-board and projecting below the bottom of the same, which box I is in communication with the ice-box, and the box J, held in the box I, and provided with a perforated bottom, $J^2$, and with a cover, J', substantially as herein shown and described.

9. The combination, with a refrigerating-counter for bar-rooms, of an ice-box formed of two or more independent removable sections, each section being provided with a work-board on the front at the middle of its height, substantially as herein shown and described.

10. The combination, with a refrigerating-counter for bar-rooms, of an ice-box having hollow walls, an air-forcing apparatus connected with the air-chamber formed by the hollow walls, and tubes connected with the chamber formed in the hollow walls and with a faucet on the bar, which tubes will be adapted to be connected with the bung or plug and with the spigot or faucet of the barrel or keg contained in the ice-box, substantially as herein shown and described.

CHARLES ELEORY CROCKETT.

Witnesses:
GEO. W. CARTER,
JACOB FUSS.